(12) United States Patent
Lee et al.

(10) Patent No.: US 6,941,288 B2
(45) Date of Patent: Sep. 6, 2005

(54) ONLINE LEARNING METHOD IN A DECISION SYSTEM

(76) Inventors: Shih-Jong J. Lee, 15418 SE. 53rd Pl., Bellevue, WA (US) 98006; Owsley Lane, 8114 NE. 145th St., Kenmore, WA (US) 98028; Seho Oh, 5229 107th St. SW., Mukilteo, WA (US) 98275

(*) Notice: Subject to any disclaimer, the term of this patent is extended or adjusted under 35 U.S.C. 154(b) by 459 days.

(21) Appl. No.: 10/118,553

(22) Filed: Apr. 8, 2002

(65) Prior Publication Data

US 2003/0191732 A1 Oct. 9, 2003

(51) Int. Cl.$^7$ ............................................. G06F 15/18
(52) U.S. Cl. ............................ 706/12; 706/14; 706/46
(58) Field of Search ..................... 706/12, 14, 46; 700/47

(56) References Cited

U.S. PATENT DOCUMENTS

| | | | | |
|---|---|---|---|---|
| 5,590,218 A | * | 12/1996 | Ornstein | 382/157 |
| 6,339,832 B1 | * | 1/2002 | Bowman-Amuah | 714/35 |
| 2003/0069652 A1 | * | 4/2003 | Lee | 700/47 |

OTHER PUBLICATIONS

Theodoridis, S., Koutroumbas, K., "Pattern Recognition", Academic Press. pp. 41–44, 1999.
Press, W., Flannery, B., Teukolsky, S, Vetterling, W., "Numerical Recipes in C", Cambridge University Press, 1988, PP. 487–494.
Keinosuke Fukunaga, "Introduction to Statistical Pattern Recognition", Second Edition Academic Press, 1990, pp. 509–531.

* cited by examiner

*Primary Examiner*—Joseph P. Hirl

(57) ABSTRACT

A learning model is initiated during start-up learning to activate operation of a decision system. During operation of the decision system, data is qualified for use in online learning. Online learning allows a system to adapt or learn application dependent parameters to optimize or maintain its performance during normal operation. Methods for qualifying data for use in online learning include thresholding of features, restriction of score space for qualified objects, and using a different source of information than is used in the decision process. Clustering methods are used to improve the quality of the learning model. Using the cumulative distribution function to compare two distributions and produce a measure of similarity derives a metric for learning maturity.

13 Claims, 6 Drawing Sheets

Defect detection classifier

Non-defect qualifier

ONLINE LEARNING METHOD IN A DECISION SYSTEM

TECHNICAL FIELD

This invention relates to online learning in a decision system.

BACKGROUND OF THE INVENTION

Many decision systems are applied in a variety of dynamic situations where a system must adapt or learn its internal structure or parameters for each situation in order to optimize or maintain its performance. For example, an image-based decision system that inspects semiconductor wafers for defects or measures system alignment and registration precision can expect the image characteristics to change as new layers are added to the wafer during various processing stages. Other dynamic applications include live cell analysis that tracks a group of cells over time or patient specific medical image analysis (such as MRI, CT, X-ray) that needs to account for the differences between imaging system setups or patients' characteristics and response to the imaging system. There are also many non-image based dynamic decision system applications, including data mining and decision support in security and financial applications, speech recognition, mobile robots, medical diagnosis and treatment support, etc.

Ideally, a learning process would take place in a supervised learning fashion wherein domain experts provide the truth labels associated with input data (labeled data). [Sergios Thodoridis and Konstantinos Koutroumbas, Pattern Recognition, Academic Press, 1999 pp 3–7] This results in learning data for which the desired outcome has been provided and the system learns to match particular distributions of inputs to the associated outputs (desired response). In practice, however, such truth labeling presents significant problems in time, expense, and availability of data that often preclude its use. Furthermore, explicit learning after a system is placed into production interrupts normal system operation, which could significantly impact the productivity of the system.

It is desirable for the system to be able to learn online while performing productive work without taking time away from production for learning and requiring minimal user intervention. To do this, the system must automatically learn from unlabeled data to improve the system's performance on future data. This is related to but different from the prior art approach known as unsupervised learning [Sergios Thodoridis and Konstantinos Koutroumbas, Pattern Recognition, Academic Press, 1999 pp 351–383]

I. Learning Environment

Ideally, a decision system that needs to adapt to changed application characteristics would have an opportunity to learn about the application data in a highly supervised environment. A domain expert would inspect a large number of subjects and identify the ones it should alarm on and the ones it should not and provide the information to the decision system. In practice, however, there are reasons why this may not be practical or possible. Data collection can be time-intensive, especially when the system is continually being exposed to new conditions. Expert truth labelers are sometimes not available in a timely fashion. In addition, for assembly-line processes, such as manufactured part defect inspection, it may simply be impossible to take the system offline for sufficient time to enable the domain expert to label a large volume of data and present it to the system for learning. To deal with this problem, the invention separates learning into two phases, startup learning 102 and online learning 106 shown in FIG. 1. The startup learning approach assumes a very small amount of labeled data 100 and so imposes strong constraints on the shape of the data distribution models which can be learned so as to minimize the variance that results from limited sample size. Online learning 106 performs further learning by automatically acquiring large volumes of learning data, which is not labeled data. A decision process 104 produces the decision output.

Feature Distribution Modeling

One of the prior art concepts of decision or classification is the representation of the data being classified, such as images or sampled sounds or more abstract objects, in terms of a set of features each of which is represented as discrete or continuous values. [L. Breiman, J. Friedman, R. Olshen, C. Stone, "Classification and Regression Trees", CRC Press LLC, 1998, pp 1–17] For example, a mechanism for inspecting people for potential health problems might use as its features cholesterol level, blood pressure, and resting pulse rate.

For a particular population, the set of samples has a particular distribution across the feature space. FIG. 2 shows an example blood pressure feature probability density distribution for healthy 200 and unhealthy 202 patients.

A higher-level feature (or combination of features) that was specifically designed to be an indicator of a healthy patient (i.e. any condition on which we wish to alarm) is derived. This could be accomplished by incorporating a large variety of lower-level features to arrive at some output for which increasing value indicates higher probability. To identify the percent of the population that were most likely to be healthy based on the blood pressure feature, we would use the cumulative distribution function (CDF). The CDF of a one-dimensional probability density distribution f(x') is described as:

$$c_f(x) = \int_{-\infty}^{x} f(x')dx'$$

In this example, x is the blood pressure value and the value of $C_f$ for the healthy population distribution 200 is the percent of the population likely to be healthy.

To do automated decision making, first measure (or model) the probability density distributions for the populations of interest. Classification is done by thresholding these distributions. There are two basic paradigms for modeling densities: functional and empirical. A functional model is constrained to achieving a particular shape, and need only learn the parameters. For example, a distribution model might be constrained to a normal distributions and need only learn the mean and variance. An empirical distribution uses actual data to construct a distribution and therefore generally requires much more data in order to reduce variance due to limited sample size.

A prior art class of models called kernel-based models [Theodoridis, S., Koutroumbas, K., "Pattern Recognition", Academic Press, pp.41–44, 1999], has densities in the one-dimensional case that take the form $$f(x) = \sum_i w_i g(x - x_i)$$

under the condition that $\int f(x)dx=1$ where g(x) is the kernel distribution, $x_i$ is the location of atom i, and $w_i$ is the weight of atom i. A commonly used kernel distribution is a Gaussian distribution. When g(x) is a Gaussian distribution, $$\sum_i w_i = 1.$$

An example of a one-dimensional kernel-based model for 3 atoms is shown in FIG. 3. In the example, there are three atoms 300, 302, 304 at locations 0.2, 0.5, and 0.7 with weights of 0.7, 0.4, and 0.8 respectively. The individual component density for atom 1, 301, atom 2, 303, and atom 3, 305, are weighted and summed to construct the overall model density 306. A simple way to produce a model of this type from a set of sampled empirical data is to set all the weights the same and use the samples themselves as atoms. The variance of the underlying Gaussian distributions can be estimated as the variance in the samples themselves.

OBJECTS AND ADVANTAGES

The invention seeks to provide continuing system improvement through online learning. A further objective is to automatically qualify data for learning use. A still further objective is to provide an indication of learning maturity to guide users in effective management of the learning system. A further objective is to minimize error in preferred regions of a probability density function model by emphasizing the regions of importance in the data space before clustering.

SUMMARY OF THE INVENTION

An online learning method for a decision system is described that uses qualified objects to train the system during operation. A measure of learning maturity is disclosed that exhibits the system's learned condition in light of the data that it is processing. Using different information than is used for the decision classifier, or by having different thresholds than are used for the decision output does qualification of data for learning. Methods for clustering data together enhance the distribution of data used to learn.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

A kernel-based model has the flexibility to accurately represent a wide variety of distributions but requires a large amount of data in order to do so without a damaging amount of variance. If the sample set is too small, one model can vary widely from another model with both having the same number of samples (but different samples) from the same distribution. One embodiment of the invention combines the advantages of kernel-based and empirical modeling by choosing as atoms for the initial learning set a functionally derived set of atoms that constrains the kernel-based model and allows a limited number of shapes of the model distribution thereby assuring model stability even with a very small number of learning samples.

Figure 1:
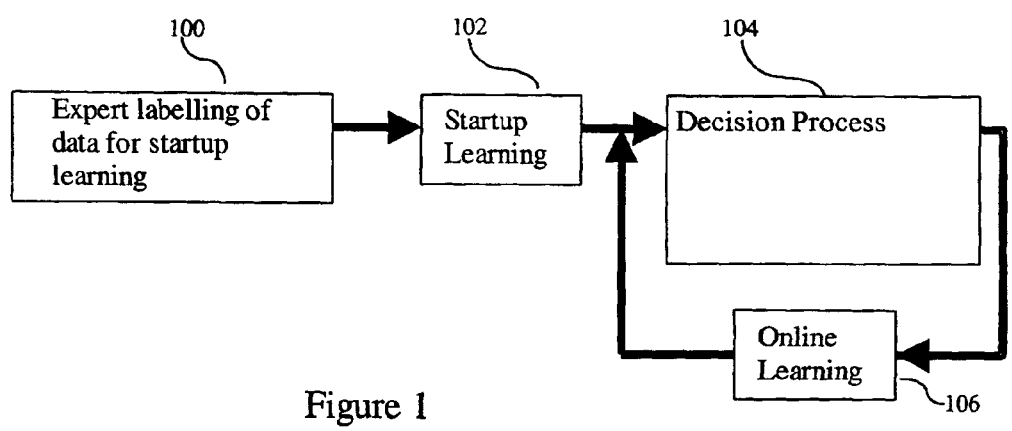
FIG. 1 shows a block diagram of a decision system processing flow, including startup and online learning processes.
Figure 2:
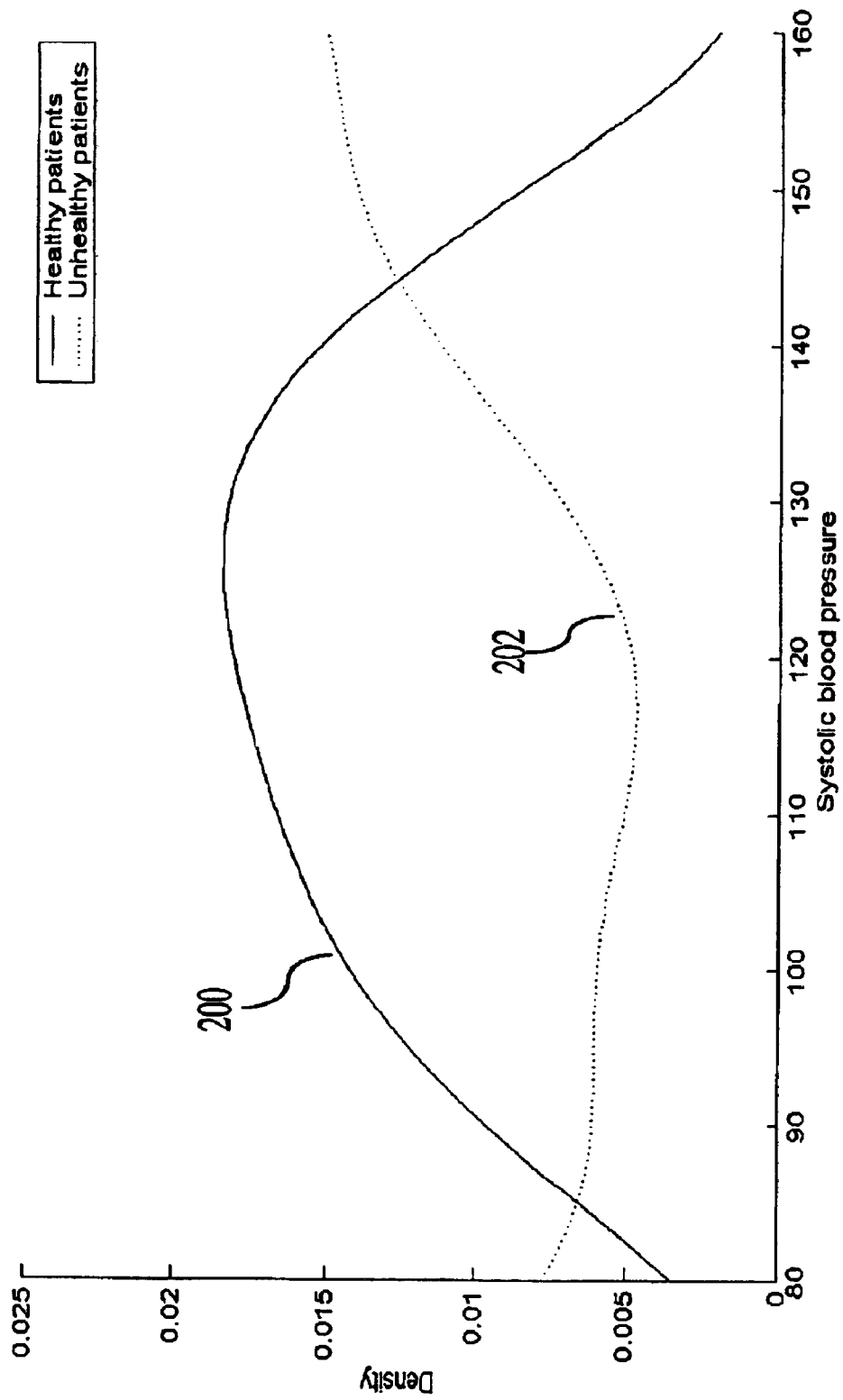
FIG. 2 shows a example diagram portraying densities of healthy and unhealthy patients as a function of systolic blood pressure.
Figure 3:
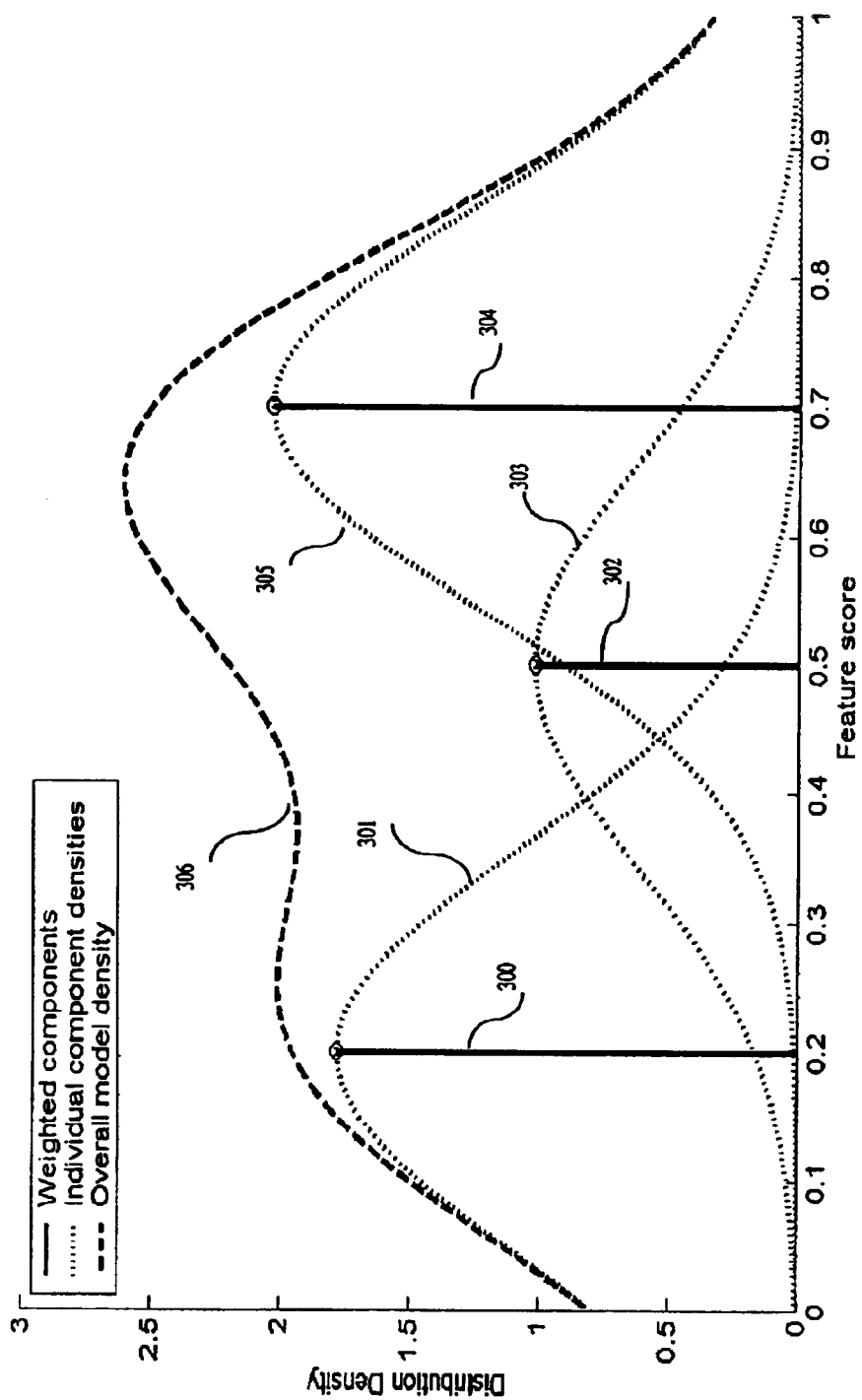
FIG. 3 shows a simple kernel-based density model with three weighted atoms and a Gaussian kernel.
Figure 4:
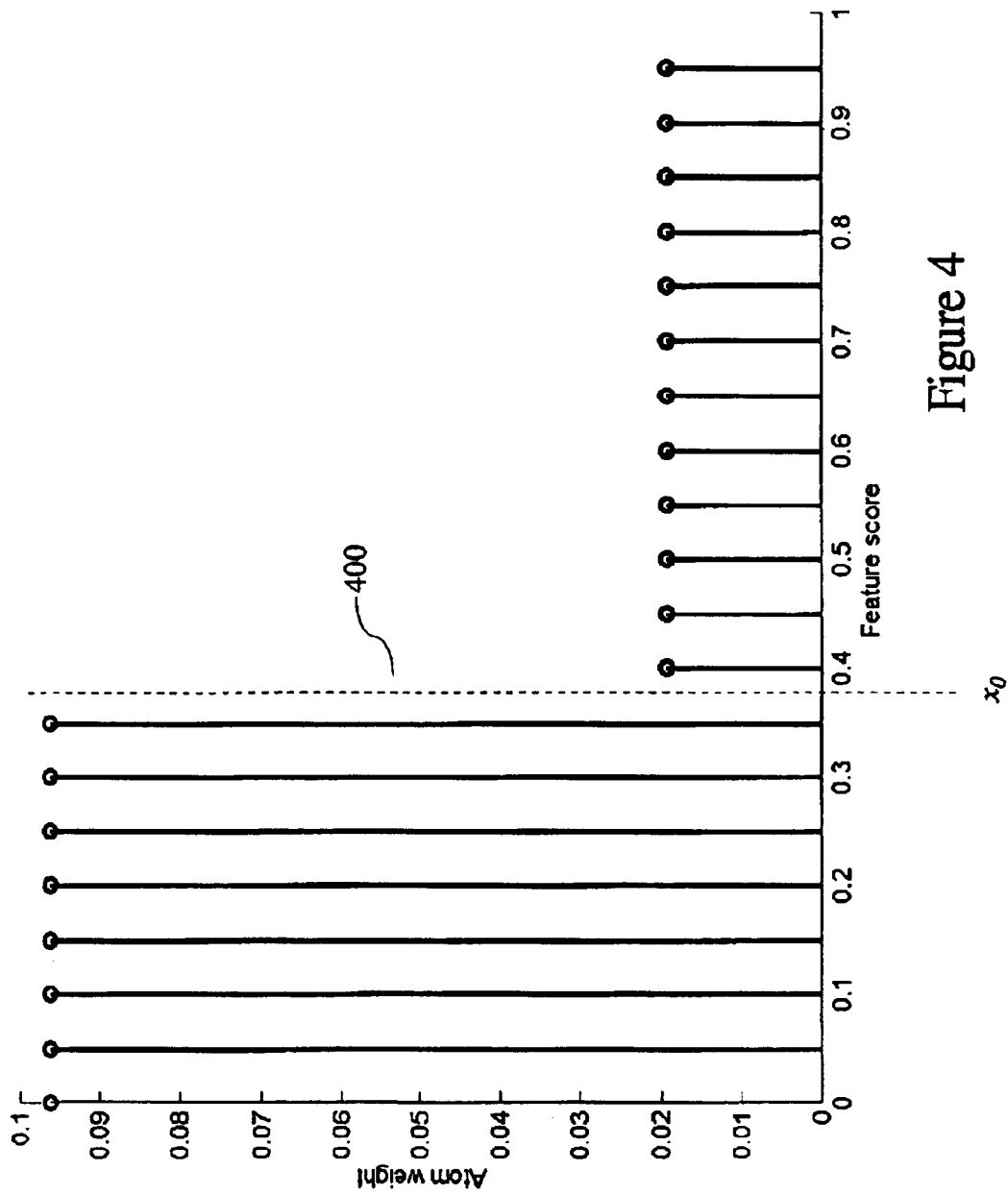
FIG. 4 shows weighted atoms that could be used to enable a kernel-based model to achieve a piecewise-uniform functional shape.

An example is shown in FIG. 4 for a one-dimensional feature that has a model of the feature score distribution that is a step function. The feature score model is $$f(x) = \sum_{i=0}^{I_0-1} wg\left(x - \frac{i}{I}\right) + \sum_{i=I_0}^{I-1} rwg\left(x - \frac{i}{I}\right)$$

where $$w = \frac{1}{I_0 + r(I - I_0)}$$

for a model with I atoms, a transition from high-density to low density at $$x_0 = \frac{I_0}{I},$$

and a desired ratio of density r. Given these 2 constraints, all learning needs to do is extract the value $x_0$ 400 at which the transition occurs and the value r which indicates the degree of transition. In one embodiment of the invention, when the number of samples used for modeling is small, the maximally scored sample is used to determine the value $x_0$.

The reason this approach is advantageous over approaches that directly use a functional model (such as a simple piecewise uniform model) is because it can model the tail of the distribution better. The example functional/empirical approach of the invention provides flexibility in successive stages of learning. An empirical feature distribution function could be determined and used to calculate the atom locations and weights. When sufficient learning data has been acquired, a switch from a functional to an empirical model can be made without changing the classification system at all. This example is not intended to constrain the invention, which is applicable multi-dimensionally and with different modeling functions.

I. Online Learning

Figure 5:
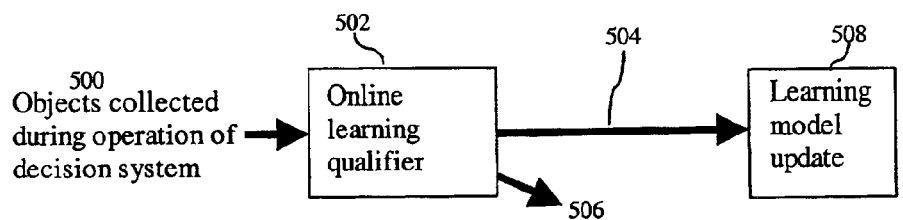
FIG. 5 shows a block diagram of the process flow of online learning.

The processing flow of one embodiment of the online learning method of the invention is shown in FIG. 5. Objects are collected during operation of the decision system 500 where it is being applied to real use. The collected objects could include normal or defective samples. The online learning method of the invention 508 updates the learning model. No human is involved in the online learning process to review the collected objects. In one embodiment of the invention, non-defect models are updated. To assure that defective objects are not included in the non-defect model updating process, an online learning qualifier 502 is applied to the collected objects 500 to qualify them for model update 504 or disqualify them for model update 506. Only qualified objects are used to update the learning model. Those skilled in the art should recognize that the model update could be for a defect model in which case the qualifier will qualify defect rather than non-defect samples for online learning.

II. Online Learning Qualifier

During normal processing of input subjects for decision making, the system has access to large amounts of raw data. However, without an expert labeler the system does not know a priori which data correspond to objects of interest (such as defects) and which correspond to normal objects (such as non-defects). One of the primary functions of this invention is to improve the model of the normal (non-anomalous) data distribution. However, this must be done without corrupting the model by incorporating data that are actually from anomalous subjects on which the system would like to alarm. If this happens in sufficient amounts, the system will come to regard such data as normal and lose its ability to classify defects. To avoid this, a number of methods are taught for qualifying data and updating the non-defect model as different embodiments of the invention.

The distinction between qualification and detection is subtle because on a gross level, both are dividing objects into defects and non-defects. The decision strategies are different between a defect detection classifier and the non-defect qualifier. In an embodiment, the purpose of detection is to alarm only on objects that are very likely to be defects in order to minimize false alarm rate. Thus, for a defect detection classifier, the objects that are not alarmed could be normal samples or missed defects. Therefore, the not-alarmed objects cannot be safely assumed to be non-defect and used for non defect model online learning. The purpose of the qualifier, on the other hand, is to identify only objects that are very likely to be non-defects, as they will be used to improve the non-defect model during online learning. Therefore, the strategy is to minimize defect objects that are qualified.

The difference between prior art classification and qualification of this invention can be further illustrated by use of three related perspectives:

1. Specifics of the categories into which objects will be divided (and purpose of division),
2. Score space over which the categorization boundary will be created,
3. Source of information on which to base the categorization boundary.

Figure 6A:
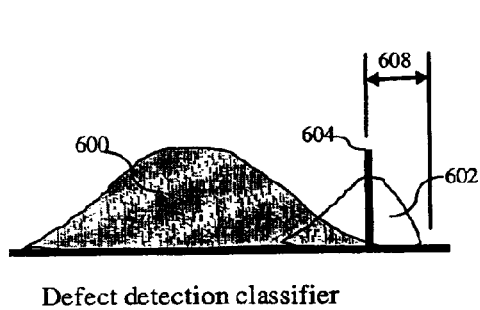
FIG. 6A shows a defect detection classifier used to separate objects into very likely defects or other.
Figure 6B:
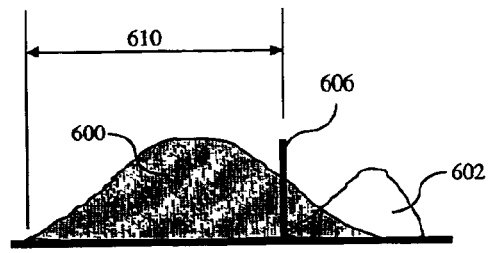
FIG. 6B shows a non-defect qualifier used to separate objects into very likely non-defects or other.

In one embodiment of the invention, a qualifier is merely a classifier with different thresholds. The difference between the non-defect qualifier (FIG. 6B) and the defect detection classifier (FIG. 6A) may be simply viewed as a difference in thresholds on the same confidence measure. In FIG. 6A the threshold 604 is set to detect defects that lie in region 608. In FIG. 6B the threshold 606 is set to qualify non-defects that lie in region 610.

Figure 7A:
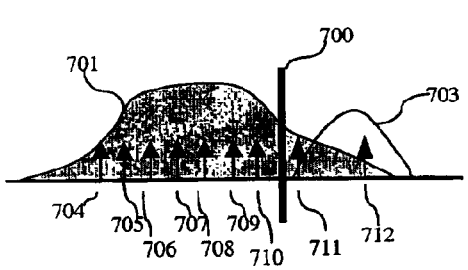
FIG. 7A shows one object qualification method in detection score space.

In another embodiment of this invention, a method similar to the above example is shown in FIG. 7A. FIG. 7A shows a hypothetical background probability density distribution 701 for normal objects and a defect probability density distribution 703 plotted for a score that the online learning system will attempt to model. Hypothetical inputs that are received are shown as arrows in the diagram distributed according to their score. A parameter that is an estimate of the fraction of images likely to be defects is used to select a fraction of the highest-scoring objects (above threshold 700) to remove from the online learning set (or disqualify them) before using the remainder to update the defect model. Objects 704, 705, 706, 707, 708, 709, 710 are accepted and 711, 712 is rejected for online learning.

Figure 7B:
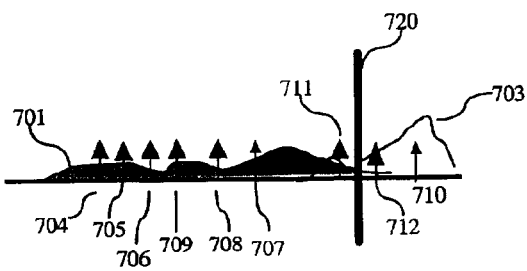
FIG. 7B shows a different object qualification method that uses another feature space to perform the qualification.

A third embodiment of the qualifier could use different information (i.e. different features) than the defect detector did in the decision-making process. FIG. 7B shows a different distribution and a different threshold 720. On the basis of this different information, different non-defect objects are qualified as shown in FIG. 7B. Arrows 704, 705, 706, 707, 708, 709, 711 indicates accepted non-defect objects. Using the different information qualifier that operates in a different feature space and has a different threshold 720, we could accept some of the non-defect objects (such as 711). Even though the FIG. 7B qualification shows 710 is not qualified, the qualified objects are a better representation of the overall distribution of data because there is no longer a hard cutoff that loses the tail information in the decision feature space. Note that the difference in feature space changes the probability density distributions for normal objects 701 and defect objects 703 in the two different feature spaces (and also that the objects themselves lie in different positions). Yet objects are recovered for learning that lie within the tail of the distribution of the score (the distribution used for defect detection in this example).

To preserve the independence of the qualifier from the main decision making classifier, a different mechanism could be used for qualification than the cut-off approach illustrated in FIG. 7B. In a preferred embodiment of the invention, a regulation tree classifier [disclosed in U.S. patent application Ser. No. 09/972,057 on Oct. 5, 2001 by Shih-Jong J. Lee entitled, "Method for Regulation of Hierarchic Decisions in Intelligent Systems" which is incorporated in its entirety herein] is used for the online learning qualifier. Different algorithms for qualification/ disqualification of objects to the existing qualifier could be based on other heuristic algorithms. In one embodiment of the invention, objects with confidence scores in the lowest $N^{th}$ percentile of the collected data are considered to be so likely to be non-defects that they are automatically qualified. In another embodiment of the invention, objects which are in the highest percentile and which exceed a certain critical hard coded (i.e. fixed, not floating) score are considered so likely to be defects that they are automatically disqualified regardless of what the outcome of the tree mentioned above is. Those skilled in the art should recognize that the model update could be for a defect model in which case the qualifier will qualify defect rather than non-defect samples for online learning.

III.2 Learning Model Update

Once we have obtained at least one qualified object 504 from the online data collection process 500, the next step is to update the decision system learning model 508 to reflect the newly gathered information. If the number of data points is small enough, an embodiment could simply add them each into the kernel-based model as atoms with a weight of 1.0. However, as the number of data points gets large this can become prohibitively expensive in terms of computation time and/or storage. Another embodiment of the invention performs clustering (grouping) on the atoms to represent them using a smaller number of atoms corresponding to cluster centers. Many clustering algorithms exist [Keinosuke Fukunaga, "Introduction to Statistical Pattern Recognition", Academic Press, 1990, pp 508–531]. The goal of the preferred embodiment is to take advantage of the knowledge of regions of the feature space that are most critical to be accurately represented to optimize the performance of the system.

Many clustering methods rely on combining individual values in such a way as to attempt to minimize an error function that may be a function of:

1. the distance between the original point location and the point into which it is clustered;
2. the weight of the point which is being clustered.

For example, an atom with weight $w_i$, and location $x_i$ that is being considered for clustering to a new atom at a location $x'$ might have a contribution to the error produced by that clustering of something as simple as:

$$e_i = |x_i - x'| w_i$$

Figure 8:
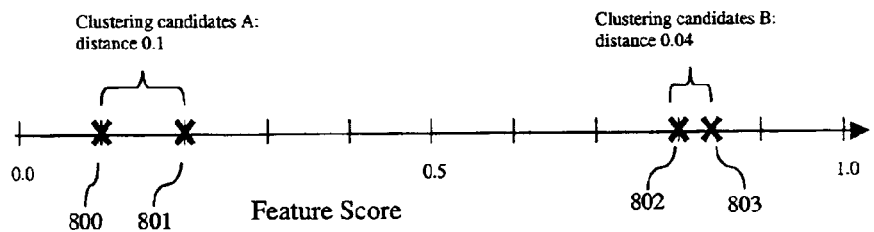
FIG. 8 shows an example of feature scores for atoms being considered for clustering.

The disadvantage of this function from the point of view of a decision system is that it gives equal weight to clusters in all regions of the space. If a learning system has a goal of establishing a threshold which corresponds to alarming on objects which are in the highest 5% of the population, for example, it is crucial that the learning system represents the distribution as accurately as possible in this range of the feature space of interest. In the preferred embodiment of the invention, the learning system allows optimization at a range of alarm rates. This specifies a region of feature space over which the system needs to maximize CDF resolution. Take the example in FIG. 8; the two atoms 802, 803 at 0.8 and 0.84 (pair B) and 800, 801 at 0.1 and 0.2 (pair A) are candidates for clustering together. In this example, the CDF operating range for this system is between 0.9 and 0.99 (to achieve alarm rates between 10% and 1%, respectively). Thus a large shifting in the density model in the region between 0.1 and 0.2 will have little effect on the estimates of locations producing CDF values between 0.9 and 0.99, but a small shift in the density model at scores between 0.8 and 0.84 could have a large effect. So it will be appropriate to cluster pair A rather than pair B.

Figure 9:
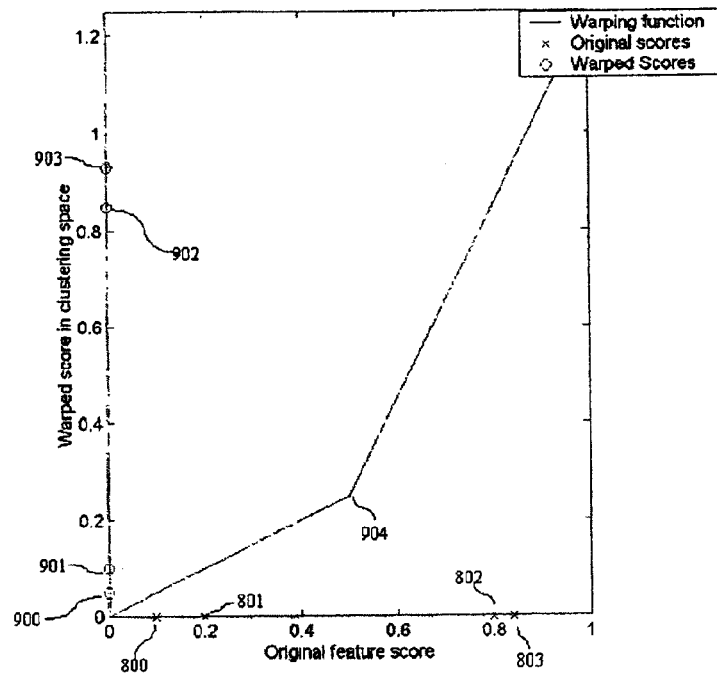
FIG. 9 shows a warping of clustering space that enables particular regions to be identified as regions where maintenance of exact atom positions is more desirable (or regions where it is unimportant)

The preferred embodiment of this invention reflects this information by performing a warping of the score space in such a way that distances in the less interesting range are decreased and distances in the range of interest are magnified. A piecewise linear version of this warping function is illustrated in FIG. 9. In FIG. 9 sample 800 is warped to 900, sample 801 is warped to 901, sample 802 is warped to 902, and 803 is warped to 903 before clustering is performed on the warped score.

After the warping, the distance between new pair A 900, 901 is 0.05, whereas the distance between pair B 902, 903 is 0.08 in the warped score. This conveys to the clustering algorithm the information that it is more desirable to cluster 900, 901 than 902, 903. By choosing the inflection points (e.g. 904) to put greater slopes above the regions an application wishes to best model, it can minimize error in selected regions of the CDF.

In the preferred embodiment of the invention, the warping function is described as follows. The warping function is a piecewise linear function described by a series of points $$v_0, v_1, .v_n, .v_N$$

such that $$v_{n-1} < v_n \text{ for all } n \in \{1, 2, \ldots, N\}.$$

and a set of slopes $$m_1, m_2, \ldots, m_n, \ldots, m_N$$

such that $$m_n > 0 \text{ for all } n \in \{1, 2, \ldots, N\}.$$

Define $$B = \max\{n | x > v_n\} + 1$$

Then the warped location of an input atom x is described as:

$$w(x) = \sum_{n=1}^{B-1} m_n(v_n - v_{n-1}) + m_B(x - v_{B-1})$$

This function is defined over the region $$[v_0, v_N].$$

Choosing a warping function is a matter of selecting regions $[v_{n-1}, v_N]$ to emphasize by setting $m_n$ to a relatively high value, or conversely to de-emphasize by setting $m_n$ to a relatively low value. The regions with the most emphasis will be least likely to have clustering performed, and thus will most retain the accuracy of representation of the distribution through the clustering process.

Those skilled in the art should recognize that other linear or nonlinear functions could be used as the warping function.

Maturity Estimation

When a system can learn not just once but at various points in its use, an important function is its ability to estimate the degree to which it has learned and the additional learning which is useful. In this invention, these concepts are expressed through an output referred to as the learning maturity score. This value is updated with each new input that is provided to the system, and provides users with a continuously updated view of the system's self-evaluation of performance. If successive learning sessions fail to increase this number significantly, then further learning is not necessary. If the trend of the learning maturity score drops off, it is an indicator that the system has started to encounter new data characteristics and it needs additional learning.

The underlying concept of the learning maturity score is to estimate how well the probability density distribution of feature scores for detection subjects (i.e. operational distribution) matches the distributions obtained during system learning for the same feature scores. One method of estimating learning maturity is to accumulate statistical qualities of each feature separately. The feature score distribution obtained during system learning is expressed as a Cumulative Distribution Function (CDF, $c_f(x)$), having input feature score values x and an output value of 0.5 for the average value of the feature score. During operation of the system after learning, the feature scores are mapped using the learned CDF function to CDF output values. The average of the CDF values so obtained is a normalized expression of their average probability density compared to the 0.5 CDF value that was obtained during learning. If the average value obtained during operation differs from 0.5, the amount of difference is a measure of dissimilarity of the operating distribution (for a particular feature score) from the original learned distribution. This concept is utilized in the preferred embodiment of the invention for maturity measurement.

Consider a sequence of feature representations of incoming subjects $x_i(k)$, where i is the index on the subject and k $\in \{0, 1, \ldots K-1\}$ is the index on the feature. Calculate the appropriate CDF value $$c(k) = C_f(x_i(k))$$

Then calculate a representation of the average of this value across the range of past subjects. For example, we could maintain a windowed average of recent data:

| Mean CDF value | Range |
|---|---|
| $\bar{c}_i(k) = c(k)$ | $i = 0$ |
| $\bar{c}_i(k) = \dfrac{i}{i+1}\bar{c}_{i-1}(k) + \dfrac{1}{i+1}c(k)$ | $i < N$ |
| $\bar{c}_i(k) = \dfrac{N}{N+1}\bar{c}_{i-1}(k) + \dfrac{1}{N+1}c(k)$ | $i \geq N$ |

Then, to calculate the maturity estimate for that feature, calculate:

$$m'_i(k) = 1 - 2|\bar{c}_i(k) - 0.5|$$

$m'_f(k)$ has its maximum (i.e. 1.0) when the mean CDF value is 0.5, and decreases the further the CDF gets from 0.5. Finally, combine the estimates from the various scores:

$$m_i = \frac{1}{K}\sum_{k=0}^{K-1} m'_i(k).$$

Those skilled in the art should recognize that other means of comparing two distributions could also be used to estimate a maturity score. For example, the $\chi^2$ test or the Kolmogorov-Smirnov test [Press, W., Flannery, B., Teukolsky, S., Vetterling, W., "Numerical Recipes in C", Cambridge University Press, 1988, PP.487–494] can be used to compare two distributions. Generally, the more alike the two distributions are, the more mature the learning.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different distributions and feature combination scores, and that various modifications, both as to the details and procedures, can be accomplished without departing from the scope of the invention itself.

What is claimed is:

1. A computerized automatic online learning method for a decision system application having a learning model comprises the following steps:
    (a) Means for collecting a plurality of unlabeled data during operation of the decision system where it is being applied to real use;
    (b) Means for applying an online learning qualifier to the collected plurality of unlabeled data to assure that defective objects are not included and automatically obtain at least one qualified non-defect object;
    (c) Means for updating the non-defect learning model of the decision system using the at least one qualified non-defect object.

2. The method of claim 1 wherein the decision system update uses the at least one qualified object to update the atom of a kernel-based model consisting of atoms, kernel distribution, and the weights of atoms.

3. The method of claim 2 wherein the kernel-based model update includes a clustering method grouping the atoms to represent them using a smaller number of atoms corresponding to cluster centers.

4. The method of claim 3 wherein the clustering method performs a warping function to decrease distances in the less interesting range and magnify distances in the range of interest in the kernel-based model.

5. A computerized automatic maturity estimation method for a decision system application for continuously updated view of the system's self-evaluation of performance having a learning model distribution comprises the following steps:
    (a) Means for obtaining a learning model probability density distribution of at least one feature score during system learning using the learning data;
    (b) Means for collecting a plurality of online learning set objects during operation of the system after learning to form an operational model probability density distribution of the at least one feature score;
    (c) Means for comparing the learning model probability density distribution of the at least one feature score to the operational model probability density distribution of the at least one feature score to generate a measure of dissimilarity;
    (d) Means for outputting a learning maturity estimate from the measure of dissimilarity.

6. The method of claim 5 wherein the measure of dissimilarity is the difference between the average CDF value of the operational model distribution and the 0.5 CDF value of the learning model distribution wherein feature scores are mapped using the learned CDF function to generate CDF values.

7. A computerized automatic learning method for a decision system application comprises the following steps:
    (a) means for inputting a plurality of expert labeled data;
    (b) means for performing startup learning using the expert labeled data to create a learning model;
    (c) means for performing online learning to update the learning model;
    (d) means for collecting a plurality of objects during operation of the decision system;
    (e) means for applying an online learning qualifier to the collected plurality of objects to generate at least one qualified object; and
    (f) means for updating the learning model using the at least one qualified object.

8. The method of claim 7 wherein the learning model is a kernel-based model consisting of atoms, kernel distribution, and the weights of atoms.

9. The method of claim 7 wherein startup learning implements a functional model as an empirical model using empirical feature distribution function to calculate the atom locations and weights.

10. The method of claim 7 wherein the computerized automatic online learning qualifier uses different information in the decision-making process.

11. The method of claim 7 wherein the learning model update uses the at least one qualified object to update the atom of a kernel-based model consisting of atoms, kernel distribution, and the weights of atoms.

12. The method of claim 11 wherein the kernel-based model update includes a clustering method grouping the atoms to represent them using a smaller number of atoms corresponding to cluster centers.

13. The method of claim 12 wherein the clustering method performs a warping function to decrease distances in the less interesting range and magnify distances in the range of interest in the kernel-based model.

* * * * *